US011955147B1

(12) United States Patent
Matsumoto

(10) Patent No.: US 11,955,147 B1
(45) Date of Patent: Apr. 9, 2024

(54) MAGNETIC RECORDING/REPRODUCING DEVICE

(71) Applicants: Kabushiki Kaisha Toshiba, Tokyo (JP); Toshiba Electronic Devices & Storage Corporation, Tokyo (JP)

(72) Inventor: Takuya Matsumoto, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/175,443

(22) Filed: Feb. 27, 2023

(30) Foreign Application Priority Data

Sep. 16, 2022 (JP) ................................ 2022-148084

(51) Int. Cl.
  *G11B 5/09* (2006.01)
  *G11B 13/08* (2006.01)
  *G11B 5/00* (2006.01)

(52) U.S. Cl.
  CPC ............... *G11B 5/09* (2013.01); *G11B 13/08* (2013.01); *G11B 2005/0021* (2013.01)

(58) Field of Classification Search
  None
  See application file for complete search history.

(56) References Cited

U.S. PATENT DOCUMENTS

| 8,582,406 | B2 | 11/2013 | Kotani et al. |
| 9,099,103 | B1* | 8/2015 | Krichevsky ............ G11B 5/012 |
| 9,472,223 | B1* | 10/2016 | Mendonsa ......... G11B 20/1816 |
| 9,569,121 | B1 | 2/2017 | Rausch et al. |
| 9,672,851 | B1* | 6/2017 | Gao ..................... G11B 5/012 |
| 9,747,942 | B2* | 8/2017 | Gao ......................... G11B 5/02 |
| 10,090,010 | B1* | 10/2018 | Erden ..................... G11B 5/58 |
| 2008/0159094 | A1 | 7/2008 | Lin |
| 2008/0298191 | A1 | 12/2008 | Van Der Kall |
| 2016/0148637 | A1* | 5/2016 | Rausch .............. G11B 20/1833 369/13.26 |
| 2016/0148641 | A1* | 5/2016 | Gao ................... G11B 20/1217 369/13.35 |
| 2017/0330591 | A1* | 11/2017 | Granz ................... G11B 7/126 |
| 2019/0227898 | A1 | 7/2019 | Gaertner et al. |
| 2021/0065739 | A1* | 3/2021 | Atsumi .................... G11B 5/03 |

* cited by examiner

*Primary Examiner* — Peter Vincent Agustin
(74) *Attorney, Agent, or Firm* — Kim & Stewart LLP

(57) ABSTRACT

According to one embodiment, a magnetic recording/reproducing device comprises a magnetic head including an assist element and configured to perform assist recording by applying assist power to the assist element, a rotation driver configured to perform rotation drive of the magnetic recording medium, a rotation number controller, and an assist power controller. The assist recording is performed under a first condition including a first rotation number and a first assist power, or under a second condition including a second rotation number which is different from the first rotation number and a second assist power which is different from the first assist power.

9 Claims, 12 Drawing Sheets

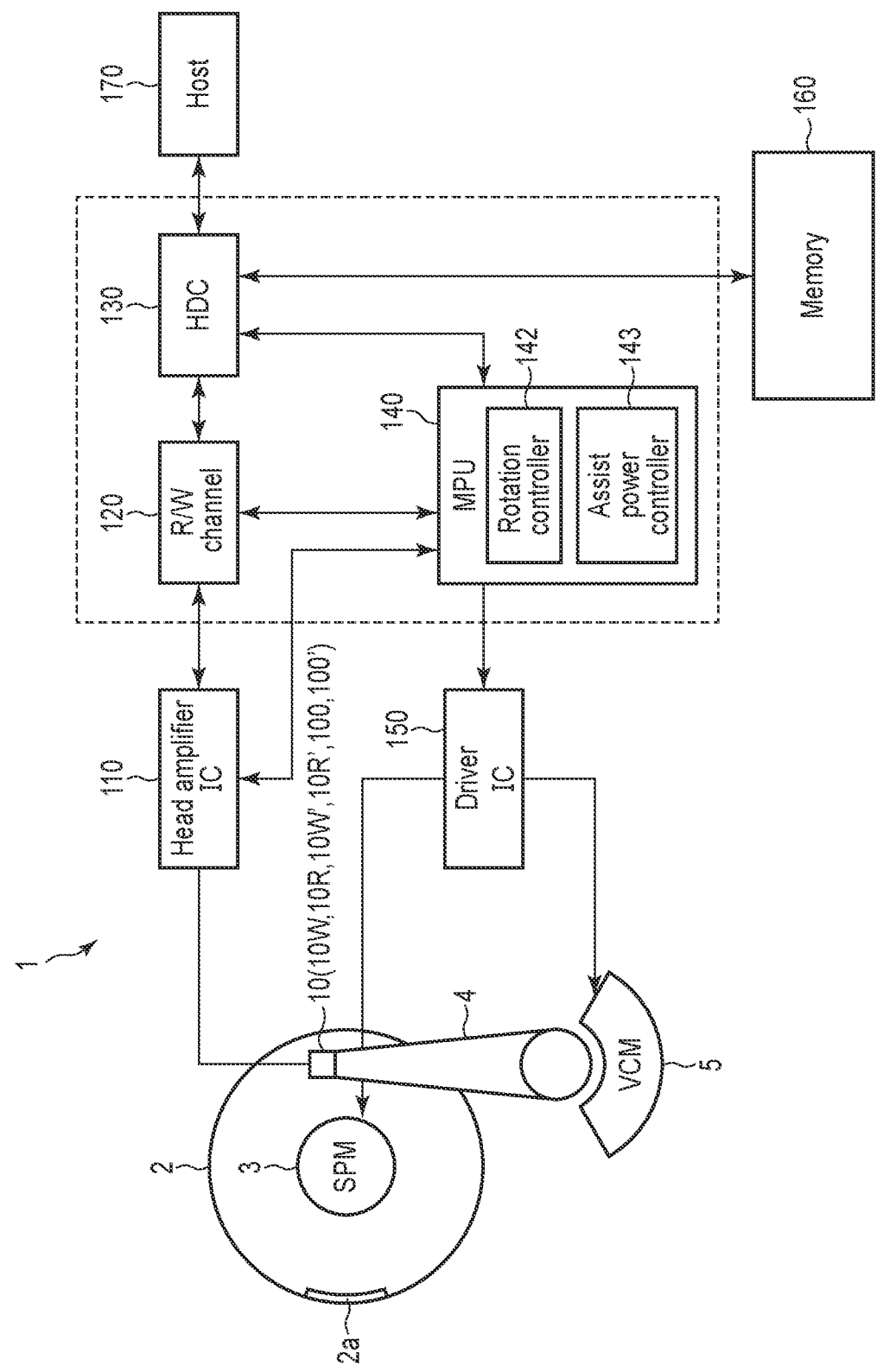
F I G. 1

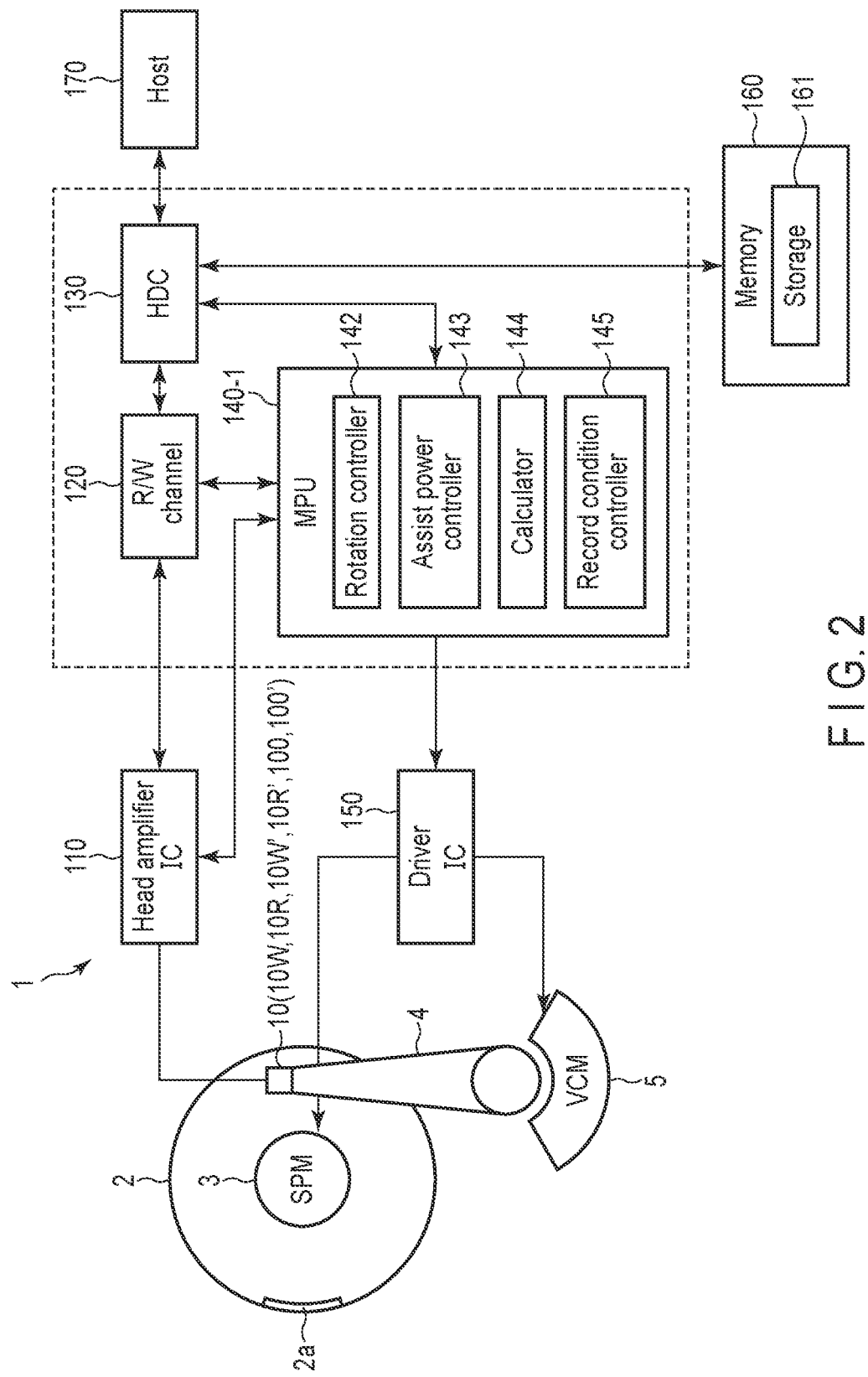
F I G. 2

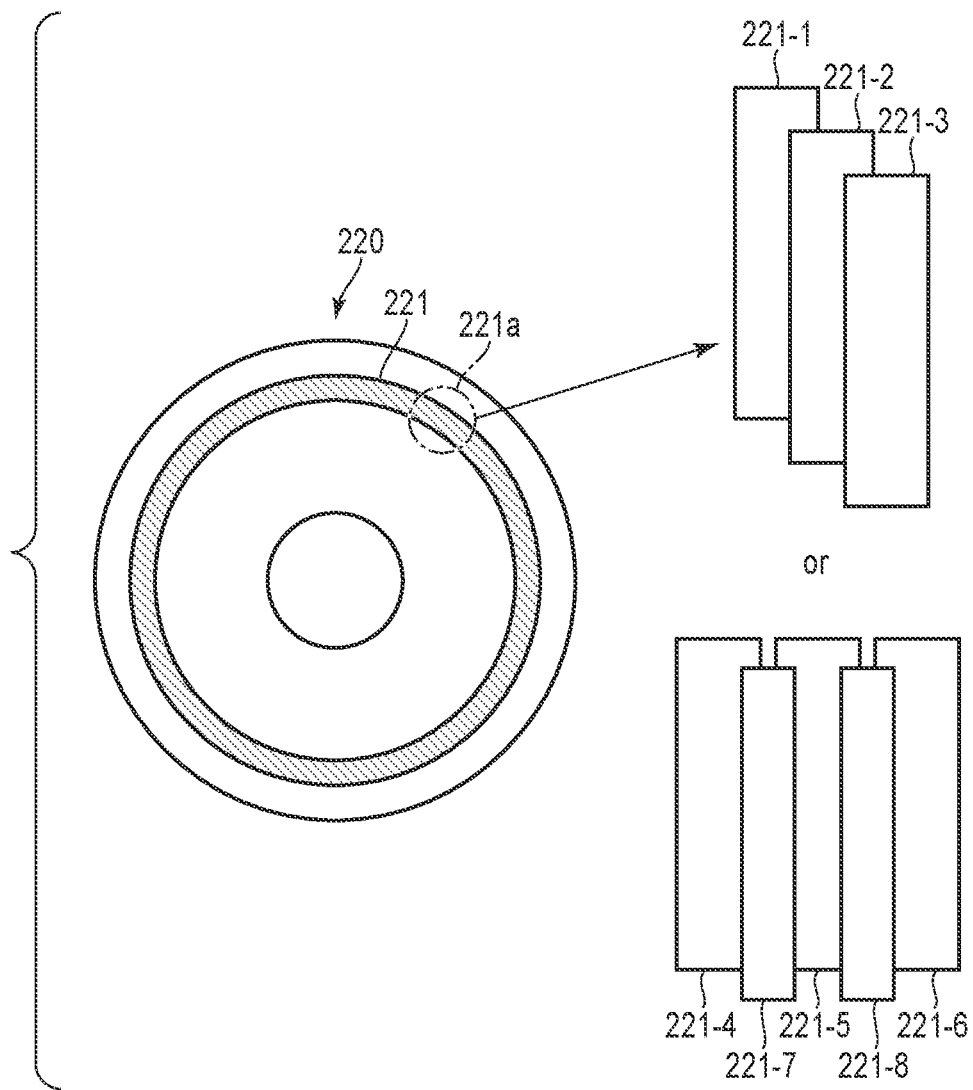
F I G. 11

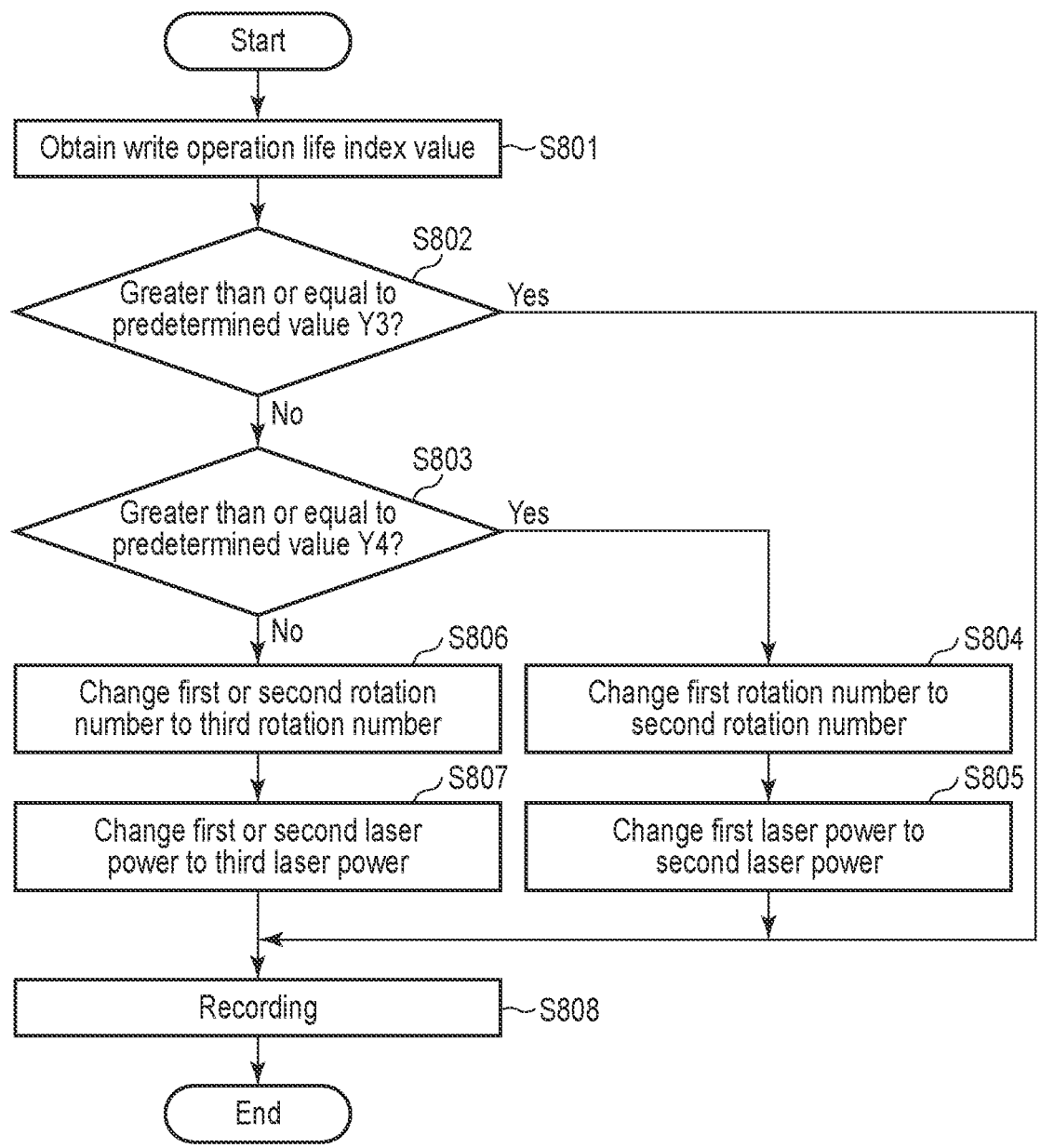
F I G. 12

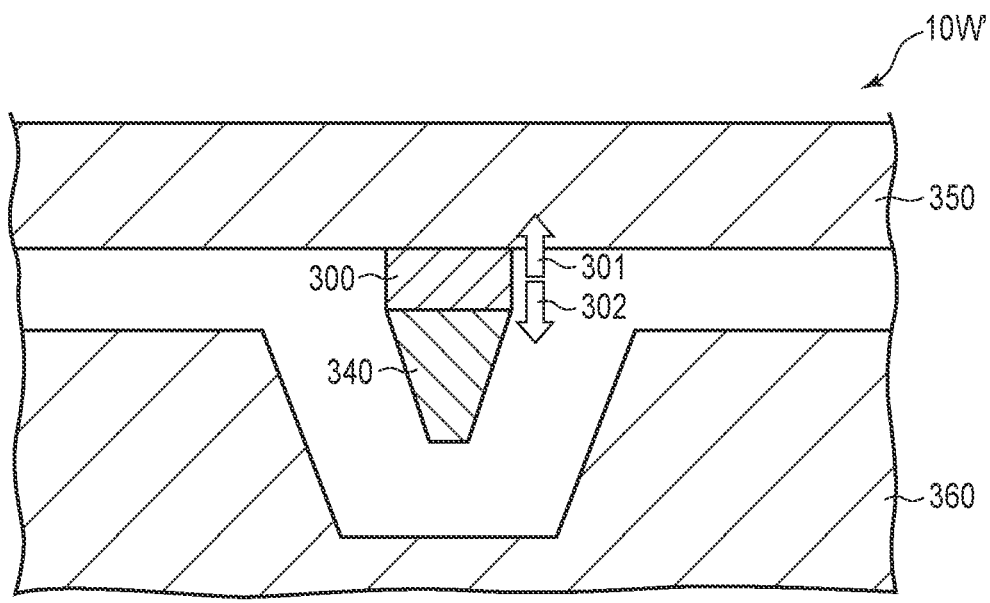
F I G. 15
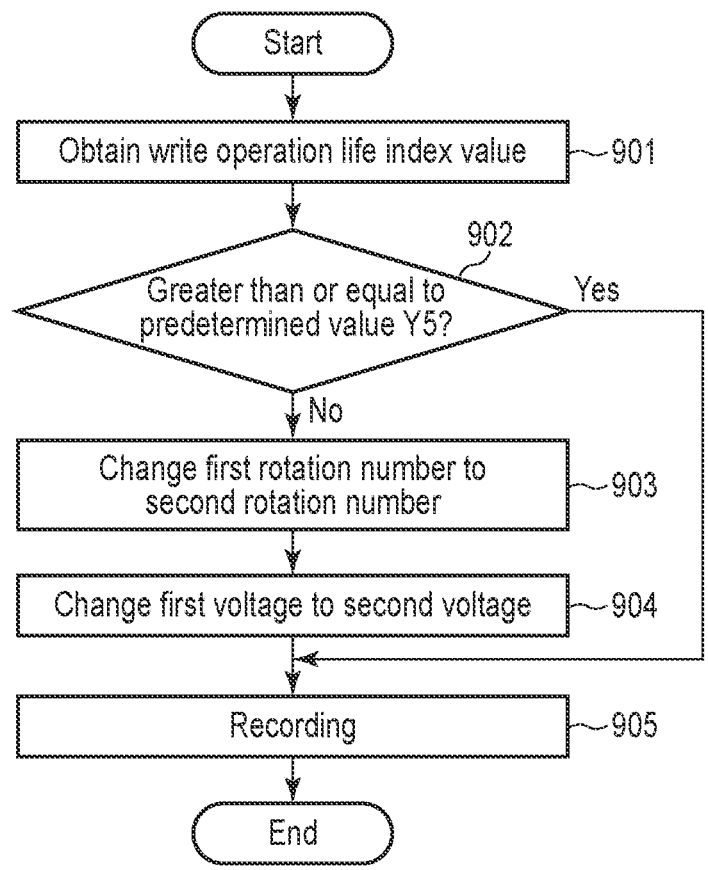
F I G. 16

MAGNETIC RECORDING/REPRODUCING DEVICE

CROSS-REFERENCE TO RELATED APPLICATIONS

This application is based upon and claims the benefit of priority from Japanese Patent Application No. 2022-148084, filed Sep. 16, 2022, the entire contents of which are incorporated herein by reference.

FIELD

Embodiments described herein relate generally to a magnetic recording/reproducing device.

BACKGROUND

A magnetic head with a near-field optical element used in thermal-assisted magnetic recording generates near-field light from the tip of the element by exposing a near-field optical element to light from a laser diode, which is a light source. The recording layer with high perpendicular magnetic anisotropy of the magnetic recording medium is locally heated. Since the coercivity of the heated recording layer is sufficiently lowered during recording, it is expected to enable high recording density.

On the other hand, since heat is generated inside the near-field optical element when near-field light is generated, damage to the near-field optical element accumulates as recording is repeated, and eventually the recording layer cannot be heated sufficiently and recording becomes impossible, such write operation life is thus a major issue.

There have been disclosed techniques to estimate the condition of the recording head by monitoring the laser application time, laser power, and radius position during recording, or algorithms to prevent variations in the amount of recording head usage, but none of the aforementioned techniques have been able to extend the life of the write operation.

BRIEF DESCRIPTION OF THE DRAWINGS

FIG. 1 is a block diagram illustrating a first magnetic recording/reproducing device of an embodiment.

FIG. 2 is a block diagram illustrating a second magnetic recording/reproducing device of the embodiment.

FIG. 11 is a diagram illustrating an example of shingled magnetic recording method of a thermal assisted magnetic recording disk.

FIG. 12 is a flowchart illustrating an example of operation of a magnetic recording/reproducing device of example 5.

FIG. 15 illustrates the recording head part of FIG. 14, viewed from the ABS surface.

FIG. 16 is a flowchart illustrating an example of operation of a magnetic recording/reproducing device of example 6.

DETAILED DESCRIPTION

Figure 3:
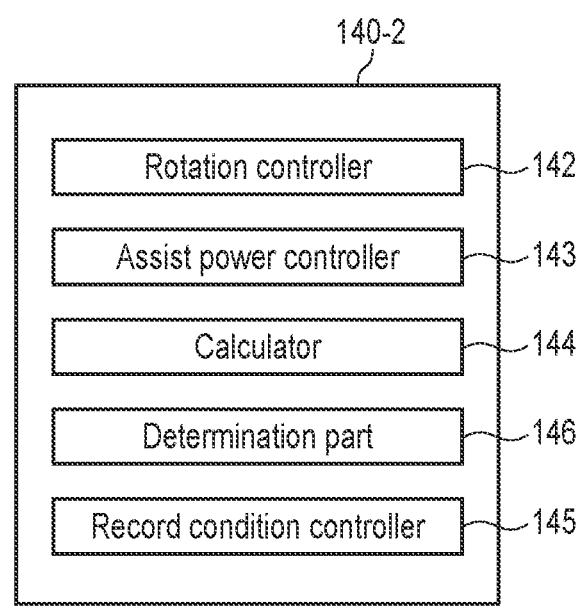
FIG. 3 is a block diagram illustrating MPU of a third magnetic recording/reproducing device of the embodiment.

In general, according to one embodiment, a magnetic recording/reproducing device includes: a magnetic head including an assist element and configured to perform assist recording by applying assist power to the assist element; a rotatable magnetic recording medium; a rotation driver configured to perform rotation drive of the magnetic recording medium; a rotation number controller configured to control a rotation number of the rotation driver; and an assist power controller configured to control assist power supplied to the assist element, wherein the assist recording is performed under a first condition in which the rotation number is a first rotation number and the assist power is a first assist power, or under a second condition in which the rotation number is a second rotation number which is different from the first rotation number and the assist power is a second assist power which is different from the first assist power.

According to the magnetic recording/reproducing device according to the embodiment, by switching the rotation number and assist power settings to the first or second condition as necessary and performing assist recording, the degradation of the assist element and the write operation life of the magnetic head based thereon can be adjusted.

Hereinafter, embodiments will be described with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

FIG. 1 is a block diagram illustrating an example of the control configuration of a magnetic disk device as the first magnetic recording/reproducing device of the embodiment.

As in FIG. 1, the magnetic disk device 1 includes a magnetic disk 2 as a magnetic recording medium, spindle motor (SPM) 3 as a rotation driver, actuator assembly 4, voice coil motor (VCM) 5, and magnetic head 10. The magnetic disk 2 has a management area 2a that records information for managing the data to be recorded.

Furthermore, the magnetic disk device 1 includes a head amplifier IC 110, R/W channel 120, hard disk controller (HDC) 13, microprocessor (MPU) 140, driver IC 150, and memory 160. The magnetic disk device 1 can be connected to a host computer (host) 170. Note that, the R/W channel 120, HDC 130, and MPU 140 may be integrated into a single-chip integrated circuit.

The magnetic head 10 includes a write head 10W, read head 10R, and assist element 100. The write head 10W writes data to magnetic disk 2. The read head 10R reads data from the magnetic disk 2. The thermal assist element 100 assists the write head 10W in writing data to the magnetic disk 2. The magnetic head may include a single or multiple magnetic heads.

The spindle motor 3 is driven by drive current (or drive voltage) supplied from the driver IC 150. The magnetic disk 2 records and resumes data patterns by the magnetic head 10.

By operating a voice coil with the voice coil motor 5 and rotating the actuator assembly 4 from the unload position of a ramp loading mechanism, which is not shown in the figure, the magnetic head 10 is moved onto a desired track of the magnetic disk 2 and positioned at a predetermined position on the magnetic disk 2. The voice coil motor 5 is driven by the drive current (or drive voltage) supplied from the driver IC 150.

The head amplifier IC 110 supplies write signals (write current) to the write head 10W according to the write data supplied from the write head 10W. It also controls the light output from the thermal assist part 100. In addition, the head amplifier IC 110 amplifies the read signal output from the read head 10R and transmits the read signal to the R/W channel 120.

The R/W channel 120 is a signal processing circuit that processes signals related to read/write. The R/W channel 120 includes a read channel that performs signal processing of read data and a write channel that performs signal processing of write data. The read channel converts read signals to digital data and demodulates read data from the digital data. The write channel encodes the write data transferred from the HDC 130 and transfers the encoded write data to the head amplifier IC 110.

The HDC 130 controls data write to the magnetic disk 2 and data read from the magnetic disk 2 through the magnetic head 10, head amplifier IC 110, R/W channel 120, and MPU 140. The HDC 130 structures the magnetic disk device 1 and the host 170 and executes transfer control of read and write data. That is, the HDC 130 functions as a host interface controller to receive signals transferred from the host 170 and to transfer signals to the host 170. Furthermore, the HDC 130 also receives commands (write commands and read commands, for example) transferred from the host 170 and transfers the received commands to the MPU 140.

The MPU 140 is the main controller (controller) of the magnetic disk device 1, and performs read/write operation control and servo control necessary for positioning the magnetic head 10. Furthermore, the MPU 140 includes a rotation number controller 142 which controls the rotation number of the spindle motor 3 as a rotation driver, and an assist power controller 143 which controls the assist power supplied to the assist element.

In assist recording, the rotation number and assist power can be set to first or second condition. If the assist recording is performed under the first condition, the rotation number controller 142 controls the driver IC to supply the drive current to the spindle motor 3 according to a first rotation number, and the assist power controller 143 controls the head amplifier IC 110 to supply the first assist power to the assist element. If assist recording is performed under the second condition, the rotation number controller 142 controls the driver IC to supply the drive current to the spindle motor 3 according to the second rotation number, and the assist power controller 143 controls the head amplifier IC 110 to supply the second assist power to the assist element 100.

The driver IC 150 controls the drive of spindle motor 3 and voice coil motor 5 in accordance with the control of the MPU 140, and when voice coil motor 5 is driven, the magnetic head 10 is positioned to a target track on the magnetic disk 2.

The memory 160 includes a volatile or a nonvolatile memory. For example, the memory 160 includes a buffer memory with a DRAM, and a flash memory.

Assist recording using assist elements includes, for example, thermal assist recording and microwave assist recording.

In a case of the thermal assist recording, the assist element is a near-field optical element as a thermal assist element, further includes a laser light source that outputs laser light to the near-field optical element, and the assist power controller can control the laser power, for example, the current or voltage applied to the laser source.

In a case of the microwave assist recording, the assist element is a spin torque element which oscillates spin torque, and the assist power controller can control the current or voltage applied to the spin torque element, for example.

In the case of thermal assist recording, the assist power is the intensity of light irradiated to the recording layer, and in the case of microwave assist recording, it is the intensity of microwaves irradiated to the recording layer. In the case of thermal assist recording, the current or voltage supplied from the power supply to the laser light source which outputs light to the near-field optical element, which is the assist element, is controlled to control the assist power, and in the case of microwave assist recording, the current or voltage supplied from the power supply to the spin torque element, which is the assist element, is controlled to control the assist power.

The second magnetic recording/reproducing device of the embodiment may further includes, in addition to the structure of the first magnetic recording/reproducing device, a storage part which stores data on the assist power during recording of the magnetic head and the accumulated time when the assist power is applied, a calculator which calculates an index value for the write operation life of the magnetic head based on the data, and a record condition controller which changes from the first condition to the second condition according to the index value.

FIG. 2 shows a block diagram illustrating an example of the control structure of the second magnetic recording/reproducing device.

The second magnetic recording/reproducing device 1-1 has the same control structure as that of the first magnetic recording/reproducing device 1 of FIG. 1 except that the second magnetic recording/reproducing device 1-1 uses MPU 140-1 instead of MPU 140 and memory 160-1 instead of memory 160 to store the data of assist power during recording of the magnetic head and accumulated time when the assist power is applied.

The MPU 140-1 includes a rotation number control part 142 which controls the rotation number of spindle motor 3 as a rotation driver, assist power controller 143 which controls the assist power supplied to the assist element 100, calculator 144 which calculates the index value of the write operation life of the magnetic head based on the data of the assist power during recording and the accumulated time when the assist power is applied, and record condition controller 145 which changes the rotation number and setting of the assist power from the first condition to the second condition according to the index value.

Here, the write operation life refers to the period during which repeated recording operations can be performed with sufficient recording quality. The write operation life depends on the assist power and the accumulated time when the assist power is applied. For example, in the thermal-assisted magnetic recording method, the write operation life depends on the laser power of the laser diode which is the laser source and the accumulated time of laser application. In the microwave-assisted magnetic recording method, the write operation life depends on the current applied to the spin torque element and the accumulated time of current application. The data of assist power and accumulated time of applying assist power can be stored in the storage 161, and if necessary, can be retrieved from storage 161.

The write operation life index value is a calculated value by which the write operation life is estimated, and can be calculated by the calculator 144 based on the data of assist power and accumulated time of applying assist power. The record condition controller 145 can change the assist power during recording and assist power setting from the first condition to the second condition according to the write operation life index value.

Furthermore, the third magnetic recording/reproducing device of the embodiment includes, in addition to the first magnetic recording/reproducing device, a storage which stores data on the assist power during the recording of the magnetic head and the accumulated time of applying the assist power, calculator which calculates an index value of the write operation life of the magnetic head based on the data, determination part which determines whether the index value satisfies a predetermined value, and record condition controller which can change from the first condition to the second condition based on the determination of the determination part.

FIG. 3 is a block diagram illustrating MPU used in the third magnetic recording/reproducing device.

The third magnetic recording/reproducing device has the same structure as the magnetic recording/reproducing device 1-1 of FIG. 2, except that MPU 140-2 of FIG. 3 is used instead of MPU 140-1.

As illustrated in the figure, the MPU 140-2 includes a rotation number controller 142 which controls the rotation number in the spindle motor 3 as a rotation driver, assist power controller 143 which controls the assist power supplied to the assist element 100, calculator 144 which calculates an index value for the write operation life of the magnetic head based on the data of the assist power during recording of the magnetic head and the accumulated time when the assist power is applied, determination part 146 which determines whether the index value satisfies a predetermined value, and record condition controller 145 which changes the rotation number and assist power setting from the first condition to the second condition based on the determination by the determination part 146.

When a magnetic recording/reproducing device according to the embodiment includes a plurality of magnetic heads and a plurality of magnetic recording media, the calculator 144 can calculate the index value of the magnetic head with the shortest light operation life based on the data of each magnetic head. Alternatively, the calculator may calculate an average index value for the write operation life of each magnetic head based on the data for each magnetic head.

Furthermore, the magnetic recording/reproducing device of the embodiment can set the second rotation number of the second condition to be lower than the first rotation number of the first condition.

In the second condition, the recording can be performed in the shingled magnetic recording method in which tracks are stacked in sequence and recording is performed over a portion of adjacent tracks, or the interlaced recording method in which a bottom track and a top track are stacked alternately in adjacent tracks and recording is performed on the bottom track and then on the interlaced top track overlaid on the bottom track, can be used for recording.

Example 1

Figure 4:
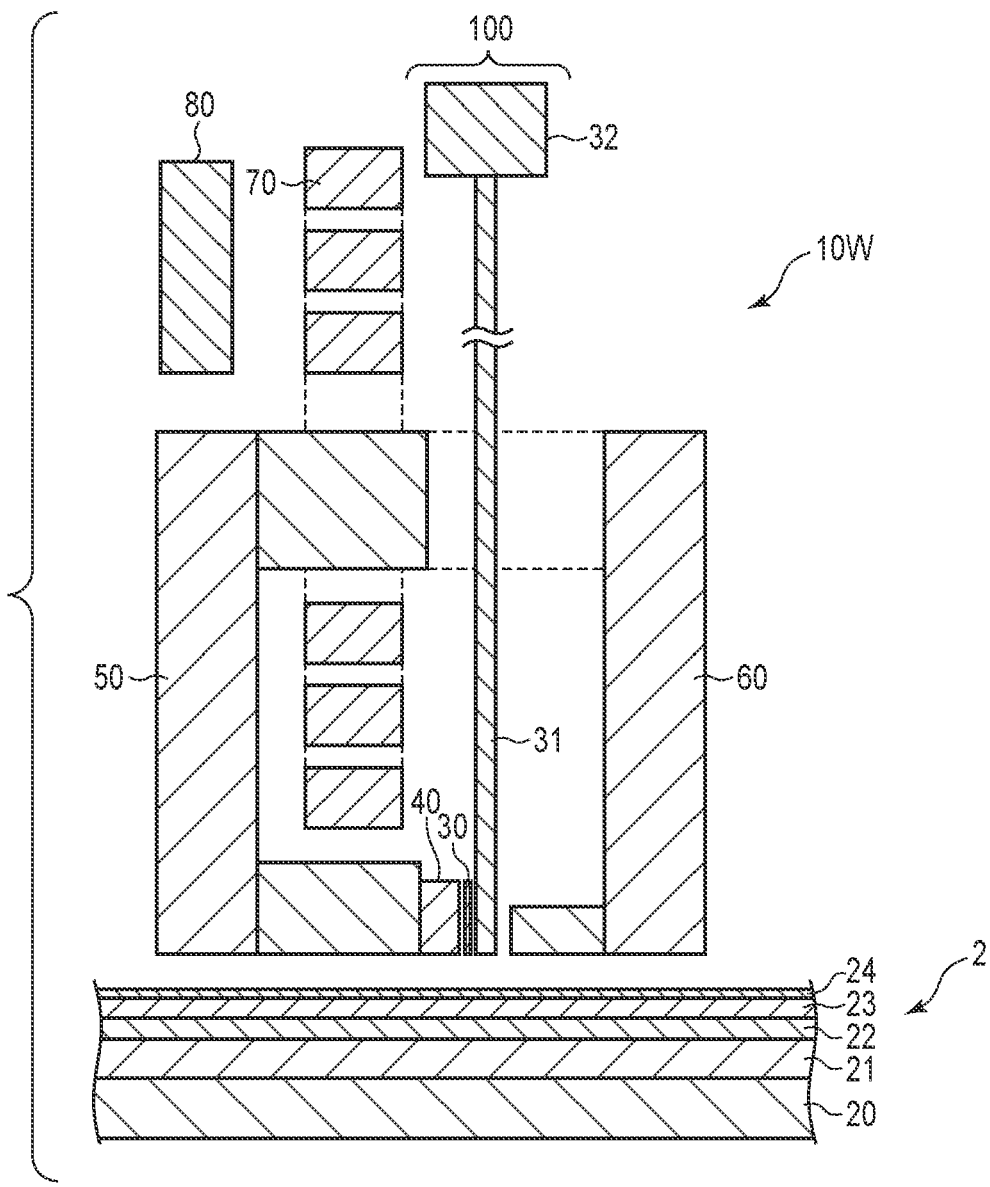
FIG. 4 is a partial horizontal cross-sectional view of a first example of the magnetic recording/reproducing device of the embodiment.

FIG. 4 is a horizontal cross-sectional view of a write head 10W and a magnetic disk 2 which are part of the magnetic recording/reproducing device of example 1 related to the first, second, and third magnetic recording/reproducing devices.

The magnetic disk 2 includes a substrate 20, heat sink layer 21 stacked in order on the substrate 20, crystal alignment layer 22, perpendicular recording layer 23, and protective film 24. The perpendicular recording layer 23 has a large anisotropy perpendicular to the disk surface. The crystal alignment layer 22 is placed under the perpendicular recording layer 23 to improve the alignment of the perpendicular recording layer 23. The heat sink layer 21 is placed under the crystal alignment layer 22 to control the spread of the heating area. The protective film 24 is disposed above the perpendicular recording layer 23 to protect the perpendicular recording layer 23.

The magnetic head 10 is a separated magnetic head in which the recording head 10W and the reproducing head 10R are separated, and the recording head 10W includes a main pole 40 formed of a high permeability material which generates a magnetic field perpendicular to the disc surface, trailing yoke 50 magnetically bonded to the main pole 40 to send a magnetic flux thereto, and return shield magnetic pole 60 which is located on the leading side of the main pole 40 to effectively close the magnetic path directly below the main pole, coil 70 arranged to wrap around the magnetic path including the trailing yoke and the return shield pole to flow the magnetic flux to the main pole 40, heater 80 to control the levitation height of the recording head, near-field light element 30 which generates near-field light which heats the perpendicular recording layer 23 of the magnetic recording medium 2 on the leading side of the main pole 40, and waveguide 31 for propagating the light for near-field light generation. The light source is a laser diode 32 mounted on the slider of the actuator assembly 4. For the near-field light element 30, for example, Au, Pd, Pt, Rh, or Ir, or alloys consisting of some combination of the above may be used. As an insulating layer between the main pole and the near-field light element, an oxide material such as $SiO_2$, or $Al_2O_3$ may be used.

Figure 5:
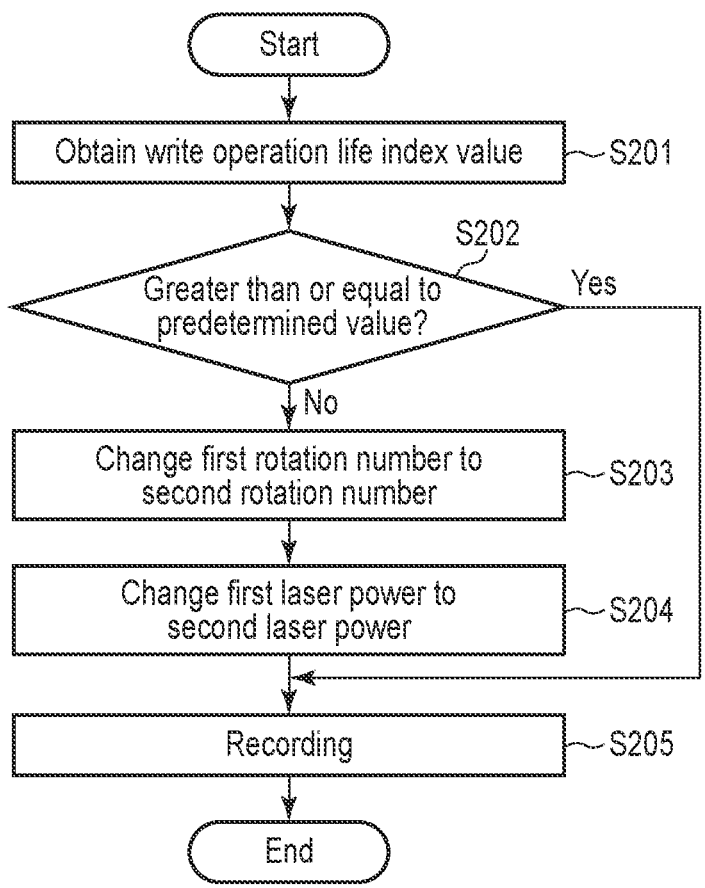
FIG. 5 is a flowchart illustrating an example of operation of the magnetic recording/reproducing device of example 1.

FIG. 5 is a flowchart illustrating an example of the operation of Example 1.

Hereinafter, an example of operation when the first magnetic recording/reproducing device of FIG. 1 is applied will be explained.

Before a recording operation, a write operation life index value can be obtained from the memory 160 (S201). The write operation life index value indicates an estimated value of the write operation life calculated by the MPU 140 based on the magnitude of the laser power as the assist power applied to the laser diode 32 and the accumulated time of laser power application. Relevant data used in the calculation may include, for example, recording current applied to the coil 70 and heater power applied to the heater 80. Here, for example, the write operation life index value of 100 is used as a reference, and when a write operation is performed, the value decreases from 100 according to the operation status, and when the value reaches 0, the write operation is disabled.

Next, the MPU 140 determines whether the acquired write operation life index value is above a predetermined value (S202). If the determination is Yes, recording is performed in the relevant area (S205). If the determination is No, the MPU 140 changes the rotation number of the magnetic disk and the laser power for recording from the first condition to the second condition. At that time, the driver IC 150 controls the drive current of spindle motor 3 according to the control of rotation number controller 142 of MPU 140, and changes the rotation number of the magnetic disk from the first rotation number to the second rotation number (S203). The assist power controller 143 of MPU 140 changes the first laser power for recording to the second laser power (S204).

Here, the second rotation number of the magnetic disk in the second condition can be lower than the first rotation number in the first condition, to be in a low rotation mode. Furthermore, the second laser power (second assist power) of the second condition may be lower than the first laser power (first assist power) of the first condition. For example, in Example 1, the first rotation number may be 7200 rpm and the first laser power may be 25 mW, and if the write operation life index value falls below a predetermined value, the rotation number may be changed to the second rotation 5400 rpm, and the first laser power is changed to the second laser power of 22 mW. The rpm is the number of revolutions per minute.

Finally, recording data is performed in the relevant area (S205), and the operation ends.

Figure 6:
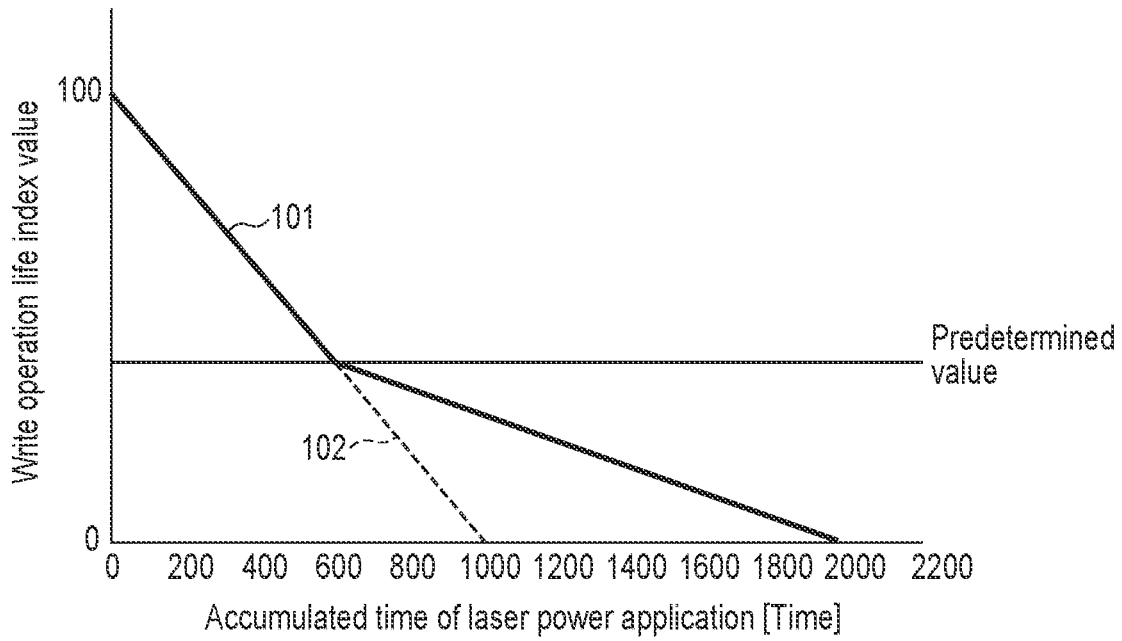
FIG. 6 is a graph illustrating a relationship between the write life index value and accumulated time of laser power application.

FIG. 6 is a graph illustrating a relationship between the write life index value and the accumulated time of laser power application, and illustrating the effect of Example 1.

Line 101 shows Example 1, and line 102 shows a conventional example in which the number of rotations of the magnetic disk and the laser power for recording are not changed. As the accumulated time of laser power application increases with repeated recording operations, the write operation life index value decreases. In Example 1, when the write operation life index value becomes below a predetermined value, the first condition is changed to the second condition, the magnetic disk rotation number is changed to the low rotation mode, and the first laser power for recording is changed to the second laser power which is lower than the normal rotation mode in order to control recording.

By reducing the laser power, as in the figure, compared to the conventional case (line 102), Example 1 (line 101) shows that the decrease in the write operation life index value becomes smaller with respect to the accumulated time of laser power application.

In the low rotation mode, the time for light irradiation to the perpendicular recording layer is longer, and recording quality is ensured even if the laser power is reduced compared to the normal rotation mode. As a result, while ensuring recording quality, the degradation of the near-field light element can be reduced and the write operation life can be extended.

When multiple magnetic heads and magnetic recording media are used, the recording operation on the recording surface which has been changed to the low rotation mode can be performed in the low rotation mode after the change, and the flow in FIG. 5 is not necessary.

Note that, the explanation in FIG. 5 describes an example of operation using the first magnetic recording/reproducing device of FIG. 1 of Example 1. However, it is also possible to apply the second magnetic recording/reproducing device of FIG. 2 or the third magnetic recording/reproducing device using the MPU of FIG. 3 as described below.

Before the recording operation, the write operation life index value is stored in the storage 161 of the memory 160, and obtained from the storage 161 (S201). The write operation life index value is an estimate value of the write operation life calculated by the calculator 144 of the MPU 140 based on the magnitude of the laser power applied to the laser diode 32 and the accumulated time of laser power application. Relevant data used in the calculation may include, for example, the recording current applied to the coil 70 and the heater power applied to the heater 80. Here, for example, the write operation life index value of 100 is used as a reference, and when a write operation is performed, the value decreases from 100 according to the operation status, and when the value reaches 0, the write operation may be disabled.

Next, the MPU 140 determines whether the acquired write operation life index value is above a predetermined value (S202). The determination can be arbitrarily made by the determination section 146. If the determination is Yes, recording is performed in the relevant area (S205). If the determination is No, the record condition controller 145 of the MPU 140 controls the rotation number controller 142 and the assist power controller 143 to change the rotation number of the magnetic disk and the laser power for recording from the first condition to the second condition. The driver IC 150 controls the drive current of the spindle motor 3 according to the control of the rotation number controller 142 of the MPU 140, and changes the first rotation number of the magnetic disk to the second rotation number in the lower rotation mode (S203). The assist power controller 143 of the MPU 140 changes the first laser power for recording to the second laser power which is lower than the first laser power (S204).

Finally, recording of the data is performed in the relevant area (S205) and the operation ends.

Example 2

Although Example 1 does not limit the number of magnetic heads in the magnetic recording device, in the case of multiple heads, the normal rotation mode and the low rotation mode exist in the same device for each recording surface, and thus, depending on the determination result of 202 of FIG. 3, it is necessary to control the number of rotations depending on the recording surface.

The magnetic recording/reproducing device in Example 2 has the same structure as Example 1 except that it is limited to using multiple magnetic heads and multiple magnetic recording media.

Figure 7:
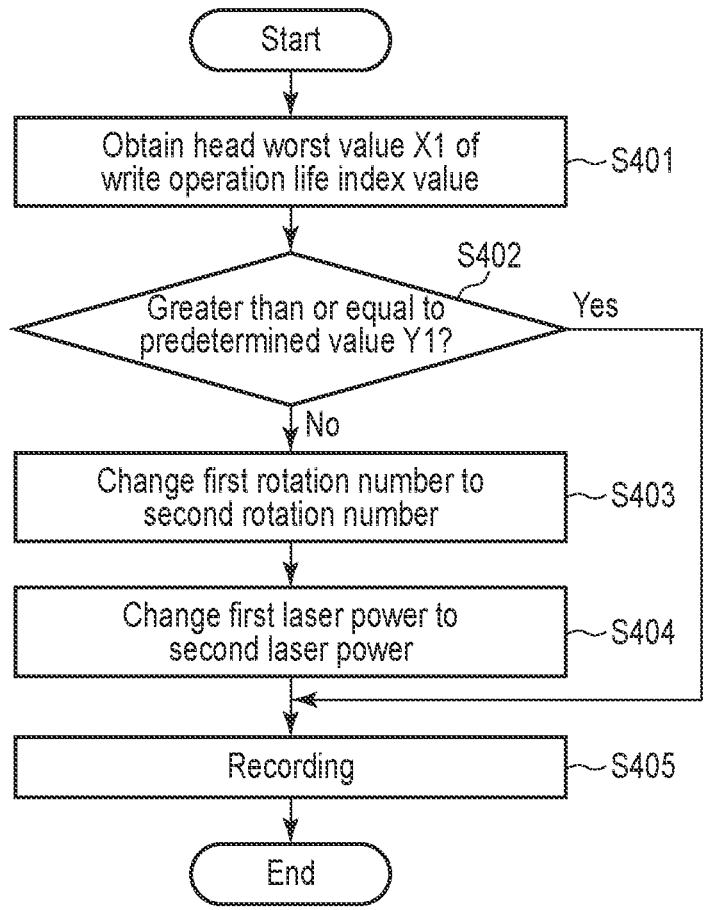
FIG. 7 is a flowchart illustrating an example of operation of the magnetic recording/reproducing device of example 2.

FIG. 7 is a flowchart illustrating an example of the operation of the magnetic recording/reproducing device of Example 2.

Before the recording operation, a worst value X1 of the write operation life index value of the magnetic recording/reproducing device of Example 2 is obtained from the memory 160 (S401). The worst value here refers to the index value of the magnetic head with the lowest write operation life index value among the write operation life index values calculated based on the data of each magnetic head for each recording. The worst value X1 of the write operation life index value is arbitrarily stored in the storage 161 of the memory 160, and can be obtained from storage 161. The worst value X1 of the write lifetime index value X1 can arbitrarily be calculated by the calculator 144.

Next, the MPU 140 determines whether the worst value X1 of the acquired write operation life index value is greater than or equal to a predetermined value Y1 (S402). The determination is arbitrarily performed by the MPU 140 (S402). If the determination in S402 is Yes, recording is performed in the relevant area (S405). If the determination in S402 is No, the MPU 140 controls the change of the rotation number of the magnetic disk and the laser power for recording from the first condition to the second condition. The MPU 140 arbitrarily controls the rotation number controller 142 and the assist power controller 143 by the record condition controller 145 to change the rotation number of the magnetic disk and the laser power for recording from the first condition to the second condition. According to the control by the rotation number controller 142 of the MPU 140, the driver IC 150 controls the drive current of the spindle motor 3 to change the first rotation number of the magnetic disk to the second rotation number in low rotation mode (S403). Furthermore, the assist power controller 143 of the MPU 140 changes the first laser power for recording to a second laser power lower than the first laser power (S404).

Finally, recording of the data is performed in the relevant area (S405) and the operation ends.

Figure 8:
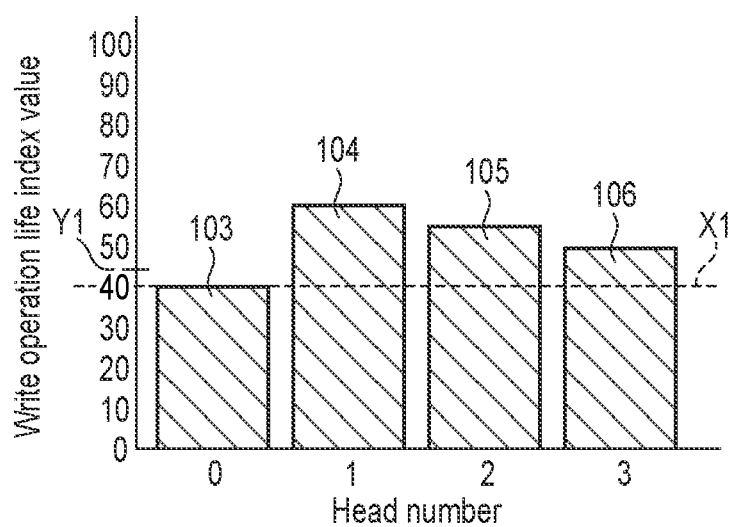
FIG. 8 is a graph illustrating write life index values with respect to each head of the magnetic recording/reproducing device including a plurality of magnetic recording heads.

FIG. 8 is a graph illustrating the write life index values for each head of a magnetic recording/reproducing device including multiple magnetic recording heads.

Here, as in FIG. 8, when recording is performed on the recording surface of head number 1, if the write operation life index value X1 of head number 0 (corresponding to the worst value of the write operation life index value) does not satisfy the predetermined value Y1, recording is performed by changing the laser power in the low rotation mode.

In the low rotation mode, the time for light irradiation to the perpendicular recording layer is longer, and thus, recording quality is secured even if the laser power is reduced compared to the normal rotation mode. As a result, while securing recording quality, the degradation of the near-field light element can be reduced and the write operation life can be extended.

The recording operation on the recording surface which has been changed to the low rotation mode may be performed in the low rotation mode without the determination as in the flowchart of FIG. 7 after the change.

Example 3

When the number of magnetic heads is multiple, the number of rotations must be controlled for each recording surface because the normal rotation mode and the low rotation mode exist in the same device for each recording surface.

The magnetic recording/reproducing device in Example 3 has the same structure as Example 1 except that it is limited to using multiple magnetic heads and multiple magnetic recording media.

Figure 9:
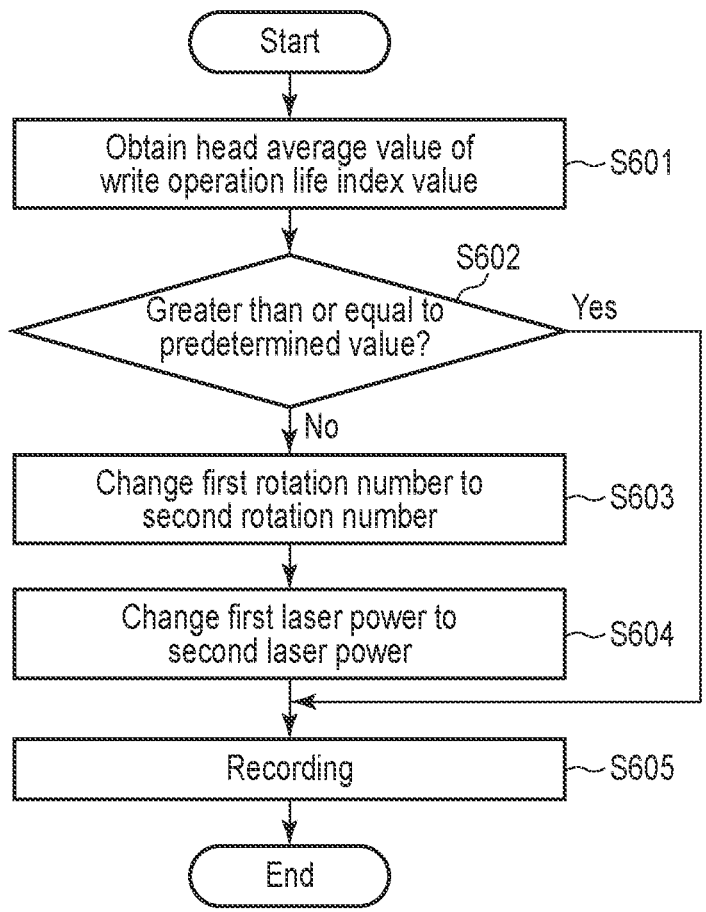
FIG. 9 is a flowchart illustrating an example of operation of the magnetic recording/reproducing device of example 3.

FIG. 9 is a flowchart illustrating an example of the operation of the magnetic recording/reproducing device in Example 3.

Before the recording operation, an average value X2 of the write operation life index value of Example 3 is obtained from the memory 160 (S601). The average value here refers to the average value of the write operation life index values calculated based on the data of each magnetic head for each recording. The average value X of the write operation life index value can arbitrarily be stored in the storage 161 of the memory 160, and retrieved from the storage 161. Furthermore, the average value X2 of the write operation life index value can arbitrarily be calculated in the calculator 144.

Next, the MPU 140 determines whether the average value X2 of the acquired write operation life index values is greater than or equal to a predetermined value Y2 (S602). The determination can be arbitrarily made by the determination section 146. If the determination in S602 is Yes, recording is performed in the relevant area (S605). If the determination of S602 is No, the MPU 140 changes the rotation number of the magnetic disk and the laser power for recording from the first condition to the second condition. The MPU 140 arbitrarily controls the rotation number controller 142 and the assist power controller 143 by the record condition controller 145 and changes the rotation number of the magnetic disk and the laser power for recording from the first condition to the second condition. According to the control of the rotation number controller 142 of the MPU 140, the driver IC 150 controls the drive of the spindle motor 3 to change the first rotation number of the magnetic disk to the second rotation number in the low rotation mode (S603). Furthermore, the assist power controller 143 of the MPU 140 changes the first laser power for recording to a second laser power lower than the first laser power (S604).

Finally, recording of the data is performed in the relevant area (S605) and the operation ends.

Figure 10:
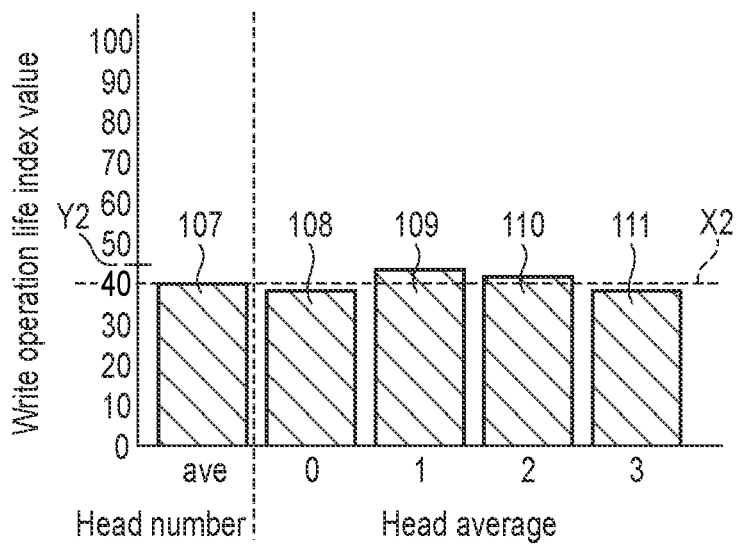
FIG. 10 is a graph illustrating write life index values with respect to each head of the magnetic recording/reproducing device including a plurality of magnetic recording heads.

FIG. 10 is a graph illustrating the write life index value for each head of a magnetic recording/reproducing device including multiple magnetic recording heads.

Here, as in FIG. 10, when recording is performed on the recording surface of head number 1, if the average value X2 of the write operation life index value does not satisfy the predetermined value Y2, the rotation number is changed to the low rotation mode and the laser power is changed to low power for recording.

In the low rotation mode, the time for light irradiation to the perpendicular recording layer becomes longer, and thus, recording quality is secured even if the laser power is reduced compared to the normal rotation mode. As a result, while securing recording quality, the degradation of the near-field optical element can be reduced and the write operation life can be extended.

After switching to the low rotation mode, it will continue to operate in the low rotation mode, and thus, the flow of FIG. 9 is not necessary.

Example 4

Example 4 is an application example of Examples 1 to 3.

In Examples 1 to 3, random write and sequential write performances during recording in the low rotation mode is inferior to those in the normal rotation mode. Therefore, the recording surface used in the low rotation mode may be controlled to record data that is determined to be cold data with low access frequency.

The recording method used may be a shingled magnetic recording (SMR) method, or interlaced magnetic recording (IMR) method.

FIG. 11 illustrates an example of a shingled magnetic recording method for a thermal assisted magnetic recording disk.

A thermal-assisted magnetic recording device can be set to perform recording using the shingled magnetic recording method in which recording is performed overlapping in a portion of adjacent tracks. When recording is performed using the shingled magnetic recording method, the size of the area recorded by the shingled magnetic recording method can be larger on the recording surface of the magnetic disk for heat-assisted magnetic recording than on the recording surface of the magnetic disk for perpendicular magnetic recording.

In FIG. 11, tracks 221-1, 221-2, and 221-3 indicate adjacent tracks within an area 221a in a plurality of tracks 221 of the thermal assisted magnetic recording magnetic disk 220. As in the figure, in the thermal assisted magnetic recording disk 220, the recording is performed in the SMR method in which the recording is performed in an overlapping manner onto a part of the tracks such as adjacent tracks 221-1, 221-2, and 221-3. Furthermore, in the shingled magnetic recording method, adjacent tracks 221-1, 221-2, and 221-3 are overlapped in sequence, but instead of tracks 221-1, 221-2, and 221-3, the interlaced magnetic recording method in which tracks such as 221-4, 221-7, 221-5, 221-8, and 221-6 are alternately overlapping each other may be adopted. In the IMR method, the recording is performed on the wide bottom tracks 221-4, 221-5, 221-6, and then on top tracks 221-7 and 221-8 interlaced with the bottom tracks 221-4, 221-5, and 221-6. This improves the track density, and enables higher recording capacity. Note that, as the SMR method, tracks sequentially overlapping such as 221-1, 221-2, and 221-3 are often utilized, and the IMR method in which tracks alternately overlap each other may be considered that the recording is performed onto partially overlapping tracks, and thus, the IMR method can be considered to be included in the SMR method.

As above, in the shingled magnetic recording method, when data is recorded on a magnetic disk, it is overlaid on a portion of adjacent tracks. In the interlaced magnetic recording method, data is recorded on the bottom track and then overlaid on the interlaced top tracked overlapping the bottom track. This improves track density and enables higher recording capacity.

Example 5

Example 5 is an application example of Examples 1 to 4.

Switching to the low rotation mode during magnetic recording can be switched in multiple steps.

For example, the rotation number and assist power can be set to first, second, and third conditions.

In Example 5, for example, a predetermined value Y3 and a predetermined value Y4 which is smaller than the predetermined value Y3 are set for the write operation life index values.

FIG. 12 is a flowchart illustrating an example of the operation of the magnetic recording/reproducing device in Example 5.

Before the recording operation, the write operation life index value is obtained from the memory 160 (S801). The write operation life index value can be arbitrarily stored in the storage 161 of the memory 160, and retrieved from storage 161 of the memory 160. Furthermore, the write operation life index value can arbitrarily be calculated in the calculator 144.

Next, the MPU 140 determines whether the acquired write operation life index value is greater than or equal to the predetermined value Y3 (S802). The determination can be arbitrarily performed by the determination part 146. If the determination in S802 is Yes, recording is performed in the relevant area (S805). If the determination in S802 is No, the MPU 140 determines whether the acquired write operation life index value is equal to or greater than the predetermined value Y4 (S803). If the determination in S803 is Yes, the MPU 140 changes the rotation number of magnetic disk and laser power for recording from the first condition to the second condition. The MPU 140 arbitrarily controls the rotation number control part 142 and the assist power controller 143 by the record condition controller 145 to change the rotation number of the magnetic disk and the laser power for recording from the first condition to the second condition. The driver IC 150 controls the drive of spindle motor 3 in accordance with the control of rotation number controller 142 of MPU 140 to change the first rotation number of the magnetic disk to the second rotation number in a low rotation mode R1 (S804). In addition, the assist power controller 143 of the head amplifier IC 110 changes the first laser power for recording supplied to the assist element 100 to the second laser power (S805) in accordance with the control of the MPU 140 (S805). If the determination of S803 is No, the MPU 140 changes the rotation number of the magnetic disk and the laser power for recording from the first or second condition to the third condition. The MPU 140 can arbitrarily control the rotation number controller 142 and the assist power controller 143 by the record condition controller 145 to change the rotation number of the magnetic disk and the laser power for recording from the first condition or the second condition to the third condition. The driver IC 150 controls the drive of spindle motor 3 according to the control of rotation number controller 142 of MPU 140 to change the first or second rotation number of the magnetic disk to a third rotation number in a low rotation mode R2 which is lower than the low rotation mode R1 (S806). Furthermore, the head amplifier IC 110 changes the first or second laser power for recording supplied to the assist element 100 to the third laser power in accordance with the control of the assist power controller 143 of the MPU 140 (S807).

The rotation number of the magnetic disk in the third condition may be set lower than the rotation number in the second condition. Furthermore, the laser power of the third condition may be set lower than the laser power of the second condition. The laser power of the second condition can be lower than the laser power of the first condition. For example, in Example 5, the first condition for recording with the first rotation number of 7200 rpm and the first laser power of 25 mW is used, and if the write operation life index value becomes below the predetermined value Y3, the second condition for recording with the second rotation number of 6,000 rpm (low rotation mode R1) and the second laser power 23 mW is used. If the write operation life index value becomes below the predetermined value Y4, the third condition with the third rotation number of 5,400 rpm (low rotation mode R2) and the third laser power of 22 mW is used.

Finally, recording of the data is performed in the relevant area (S808) and the operation ends.

Figure 13:
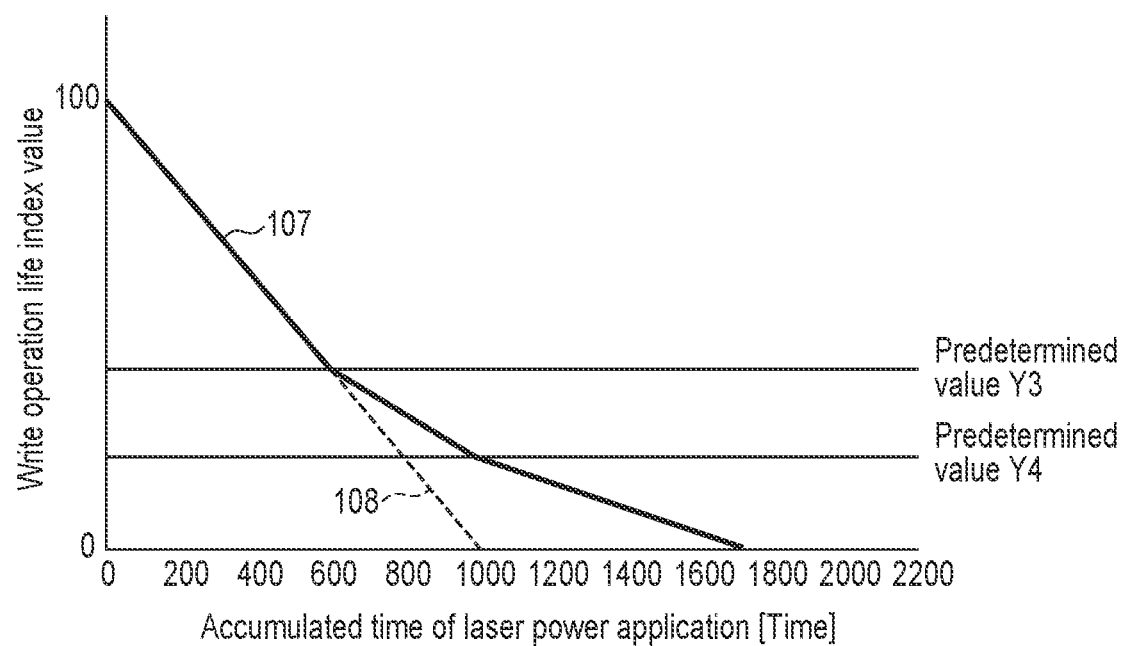
FIG. 13 is a graph illustrating a relationship between the write life index value and the accumulated time of laser power application.

An effect of Example 5 is shown in FIG. 13.

FIG. 13 is a graph illustrating a relationship between the write life index value and the accumulated time of laser power application.

Line 107 shows Example 5, and line 108 shows a conventional example in which the rotation number of magnetic disk and the laser power for recording are not changed. As the accumulated time of laser power application increases with repeated recording operations, the write operation life index value decreases. In Example 5, when the write operation life index value becomes below the predetermined value Y3, the rotation number of magnetic disk is changed to low rotation mode R1 and the laser power for recording is reduced compared to the normal rotation mode. Furthermore, when the write operation life index value becomes below the predetermined value Y4, the rotation number of magnetic disk is changed to the low rotation mode R2 and the laser power for recording is further reduced compared to the normal rotation mode to control the recording. Thus, compared to the conventional example (line 108), in Example 5 (line 107), the decrease in the write operation life index value becomes smaller in relation to the accumulated time of laser power application as compared to the conventional example (line 108).

Thus, according to Example 5, in low rotation modes R1 and R2, the time to irradiate the light to the media recording layer is longer, and thus, the recording quality is secured even if the laser power is lower than in the normal rotation mode. Therefore, the recording quality is maintained while securing recording quality, the degradation of the near-field optical element of the magnetic head can be reduced and the write operation life can be extended.

After switching to the low rotation mode R2, the operation to the media recording layer is performed in the low rotation mode R2, and thus, the flow of FIG. 12 is not necessary.

Example 6

Examples 1 to 5 show examples of magnetic recording/reproducing devices using the thermal-assisted magnetic recording method. In Example 6, a microwave-assisted magnetic recording/reproducing device will be used.

Figure 14:
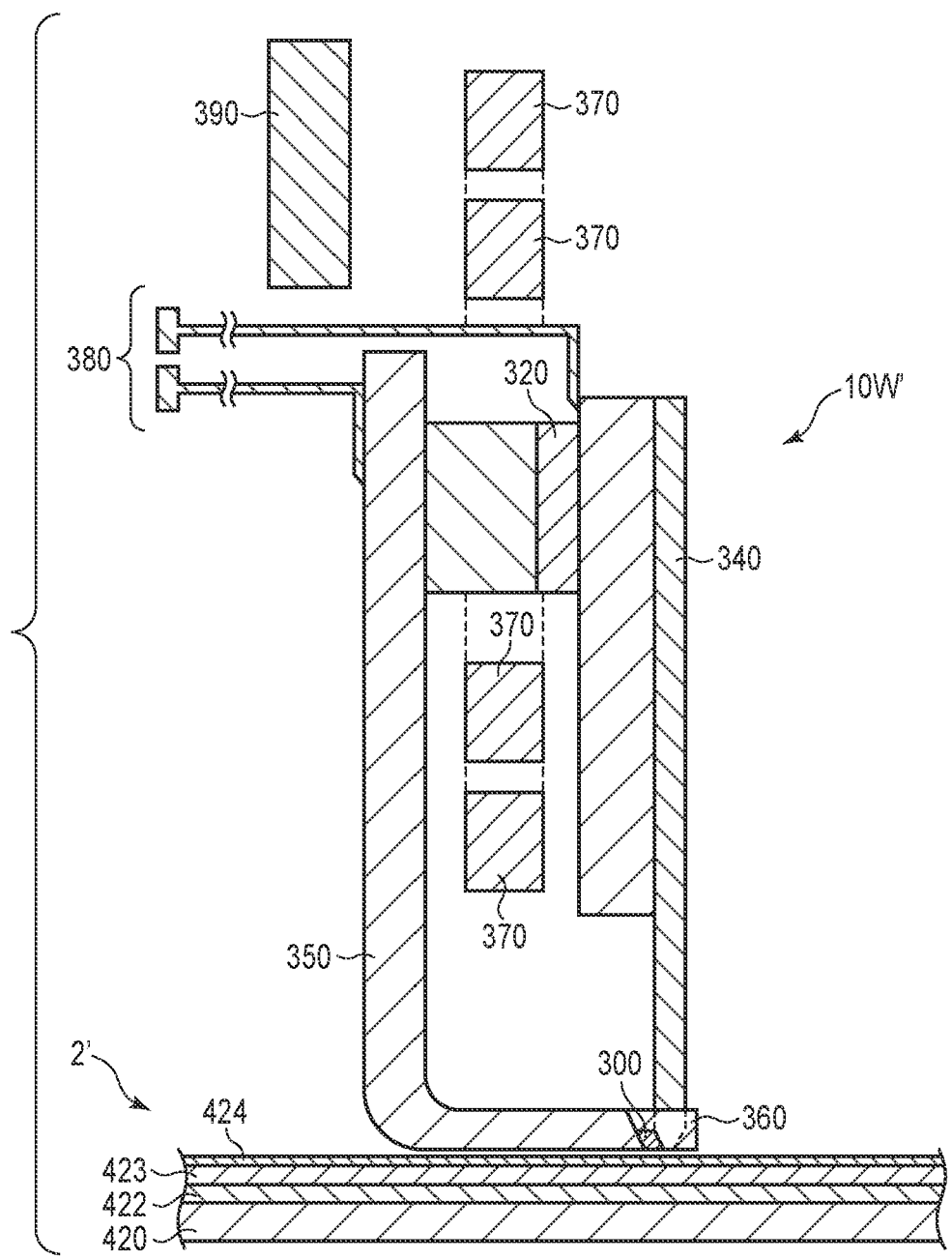
FIG. 14 is a partial horizontal cross-sectional view of a magnetic recording/reproducing device of example 6.

FIG. 14 is a horizontal cross-sectional view of a write head 10W' of the magnetic head and a magnetic disk 2', which are part of the magnetic recording/reproducing device of Example 6 related to the first, second and third magnetic recording/reproducing devices.

FIG. 15 illustrates the recording head portion of FIG. 14, viewed from the ABS surface.

The magnetic disk 2' is a perpendicular bilayer medium including a soft magnetic layer 422 on a substrate 420 and a perpendicular recording layer 423 which is anisotropic perpendicular to the disk surface. A protective layer 424 is provided on the perpendicular recording layer 423.

The magnetic head 10 is a separated magnetic head in which the recording head 10W' and a reproducing head 10R' are separated, and the recording head 10W' includes a main pole 340 formed of a high permeability material which generates a magnetic field perpendicular to the disk surface, heater 390 to control a levitation height of the recording head 10W', light shield magnetic pole 350 provided to efficiently close the magnetic path through a soft magnetic layer 422 directly below the main pole 340 of the vertical magnetic head located on the trailing side of the main pole 340, side shield 360 arranged on both sides of the track width direction of the main pole 340 while being formed of a high permeability material physically separated from the main pole 340 on the ABS plane, and a coil 370 arranged to wrap around the magnetic path including the main pole 340 and the light shield magnetic poke 350.

Furthermore, a spin torque element 300 is positioned between the tip of the main pole 340 and the light shield pole 350 to function as a microwave assist part 100'. The spin torque element 300 is a laminated structure including magnetic and non-magnetic materials.

At the junction of the main pole 340 and the light shield magnetic pole 350, as in FIG. 14, an electrically insulating layer 320 is placed, and the parts which are insulated from each other are electrically connected to the drive terminal electrode 380, respectively. This allows the light shield magnetic pole 350 and the main pole 340 to act as electrodes which perpendicularly energize the spin torque element 300.

FIG. 16 is a flowchart illustrating an example of the operation of the magnetic recording/reproducing device in Example 6.

Before the recording operation, the write operation life index value is obtained from the memory 160 (901). The write operation life index value indicates a write operation life calculated by the MPU 140 based on the magnitude of the voltage applied to the spin torque element and the accumulated time of application. The relevant data used in the calculation may include, for example, the recording current applied to the coil 370, and heater power applied to heater 390. In Example 6, the write operation life index value of 100 is used as a reference, and the value decreases from 100 to 0 as write operations are performed. When the value reaches 0, the write operation is disabled. The write operation life index value may be arbitrarily stored in the storage 161 of the memory 160 and retrieved from the storage 161. Furthermore, the write operation life index value may optionally be calculated in the calculator 144.

Next, the MPU 140 determines whether the acquired write operation life index value is greater than or equal to a predetermined value (S902). The determination can be arbitrarily performed by the determination part 146. If the determination in S902 is Yes, the recording is performed in the relevant area (S905). If the determination in S902 is No, the MPU 140 changes the rotation number of the magnetic disk and the laser power for recording from the first condition to the second condition. The MPU 140 arbitrarily controls the rotation number controller 142 and the assist power controller 143 by the record condition controller 145 to change the rotation number of magnetic disk and the laser power for recording from the first condition to the second condition. The driver IC 150 controls the drive of spindle motor 3 to change the first rotation number of the magnetic disk to the second rotation number in the low rotation mode according to the control of the rotation number controller 142 of the MPU 140 (S903). Furthermore, the assist power controller of the MPU 140 changes a first voltage as a first assist power applied to the sin torque element to a second voltage as a second assist power (S904).

Finally, recording of the data is performed in the relevant area (S905) and the operation ends.

Here, the second rotation number of the magnetic disk in the second condition can be lower than the first rotation number in the first condition. Furthermore, the second voltage in the second condition can be lower than the first voltage in the first condition. For example, in Example 6, the first rpm of 7200 rpm and the first voltage of 100 mV are used for the recording, and if the write operation life index value becomes below a predetermined value Y5, the second rotation number of 5400 rpm and the second voltage of 80 mV are used for the recording. The rpm indicates the number of revolutions per minute.

The oscillation of a spin torque element is caused by the rotation of the magnetization of the device in its natural period of oscillation due to the balance between the gap magnetic field applied to the element and the spin injection force. The gap magnetic field varies with the recording current that flows through the coil of the magnetic head. Since the gap magnetic field increases as the recording current increases, the voltage applied to the spin torque element must be increased in order for the spin injection force to be balanced.

Applying a voltage to the spin torque element causes heat to be generated inside the spin torque element, and repeated recordings cause damage to the spin torque element to accumulate, eventually leading to insufficient oscillation of the spin torque element and degradation of recording quality. The write operation life depends on the magnitude of the voltage applied to the spin torque element and the accumulated time of application.

In Example 6, the write operation life index value, which is an estimate of the write operation life, is monitored, and if the index value does not satisfy the predetermined value, the rotation number of the magnetic disk is switched to the low rotation mode and the voltage applied to the spin torque element is changed to be smaller. When the rotation number is high, the rise of the magnetic field generated from the main poles must be faster, and the recording current must be increased. Conversely, when the rotation number is lowered, the recording current can be reduced, and thus, the voltage applied to the spin torque element can be reduced such that the spin injection force is balanced. As a result, even if the voltage applied to the spin torque element is reduced, recording quality can be maintained and damage to the spin torque element can be reduced to extend the write operation life.

As can be understood from the above, according to Examples 1 to 6, a write operation life index value estimated for a write operation life is monitored, and if the index value does not meet a predetermined value, a rotation number of magnetic disk is switched to a low rotation mode of a second condition which is lower than a rotation mode of a first condition, and an assist power is changed to an assist power of a second condition which is lower than an assist power of a first condition. When the rotation number is lowered, the time to irradiate light to a media recording layer is longer, so even if the assist power is reduced, the recording quality can be maintained, and the degradation of the assist element of a magnetic head can be reduced to extend the write operation life.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording/reproducing device, comprising:
   a magnetic head including an assist element and configured to perform assist recording by applying assist power to the assist element;
   a rotatable magnetic recording medium;
   a rotation driver configured to perform rotation drive of the magnetic recording medium;
   a rotation number controller configured to control a rotation number of the rotation driver; and
   an assist power controller configured to control assist power supplied to the assist element, wherein
   the assist recording is performed under a first condition in which the rotation number is a first rotation number and the assist power is a first assist power, or under a second condition in which the rotation number is a second rotation number which is different from the first rotation number and the assist power is a second assist power which is different from the first assist power.

2. The magnetic recording/reproducing device of claim 1, wherein the assist recording using the assist element is thermal assist recording or microwave assist recording.

3. The magnetic recording/reproducing device of claim 2, wherein the assist element is a near-field optical element, and further includes a laser light source configured to output laser light onto the near-field optical element, and the assist power controller controls current or voltage applied to the laser light source.

4. The magnetic recording/reproducing device of claim 2, wherein the assist element is a spin torque element which oscillates spin torque, and the assist power controller controls current or voltage applied to the spin torque element.

5. The magnetic recording/reproducing device of claim 1, further comprising:
   a storage configured to the assist power in a recording time of the magnetic head and data of accumulated time of application of the assist power;
   a calculator configured to calculate an index value of a write operation life of the magnetic head based on the data; and
   a record condition controller configured to change the first condition to the second condition in response to the index value.

6. The magnetic recording/reproducing device of claim 5, comprising a plurality of magnetic heads and a plurality of magnetic recording media, wherein
   the calculator calculates, based on the data of each magnetic head, an index value of a magnetic head with a shortest write operation life.

7. The magnetic recording/reproducing device of claim 5, comprising a plurality of magnetic heads and a plurality of magnetic recording media, wherein
   the calculator calculates, based on the data of each magnetic head, an average index value of the write operation lives of the magnetic heads.

8. The magnetic recording/reproducing device of claim 5, further comprising a determination part configured to determine if the index value satisfies a predetermined value, wherein
   the record condition controller changes the first condition to the second condition based on the determination by the determination part.

9. The magnetic recording/reproducing device of claim 5, wherein
   the second rotation number of the second condition is lower than the first rotation number of the first condition, wherein
   the second condition performs a shingled magnetic recording method in which recording is performed partially overlapped to adjacent tracks which orderly overlap with each other, or an interlaced magnetic recording method in which recording is performed to adjacent tracks with alternately overlapped bottom tracks and top tracks by first recording to the bottom track and then recording to the interlaced top tracks overlapping the bottom tracks.

* * * * *